United States Patent [19]

Williams

[11] Patent Number: 5,607,736
[45] Date of Patent: Mar. 4, 1997

[54] ELASTIC BINDING DEVICE WITH RUBBER TUBING CORE

[76] Inventor: David D. Williams, 1496 Trumansburg Rd., Ithaca, N.Y. 14850

[21] Appl. No.: 466,477

[22] Filed: Jun. 6, 1995

[51] Int. Cl.⁶ .................................................. B29D 22/00
[52] U.S. Cl. .................... 428/36.3; 428/36.8; 428/36.9
[58] Field of Search ........................... 428/35.7, 36.1, 428/36.3, 36.8, 36.9

[56] References Cited

U.S. PATENT DOCUMENTS 377,027  1/1888  Green et al. .
1,050,442  1/1913  Frissell .
3,130,630  4/1964  Dawes .
4,513,063  4/1985  Hashi et al. .

FOREIGN PATENT DOCUMENTS 3045039  2/1988  Japan .

*Primary Examiner*—James J. Bell
*Attorney, Agent, or Firm*—Barnard, Brown & Michaels

[57] ABSTRACT

An elastic binding devise consisting of a core of one or more latex rubber tubes covered with a woven jacket that can be elongated and contracted with the core.

5 Claims, 5 Drawing Sheets

*Figure 3b*
*Figure 3a*
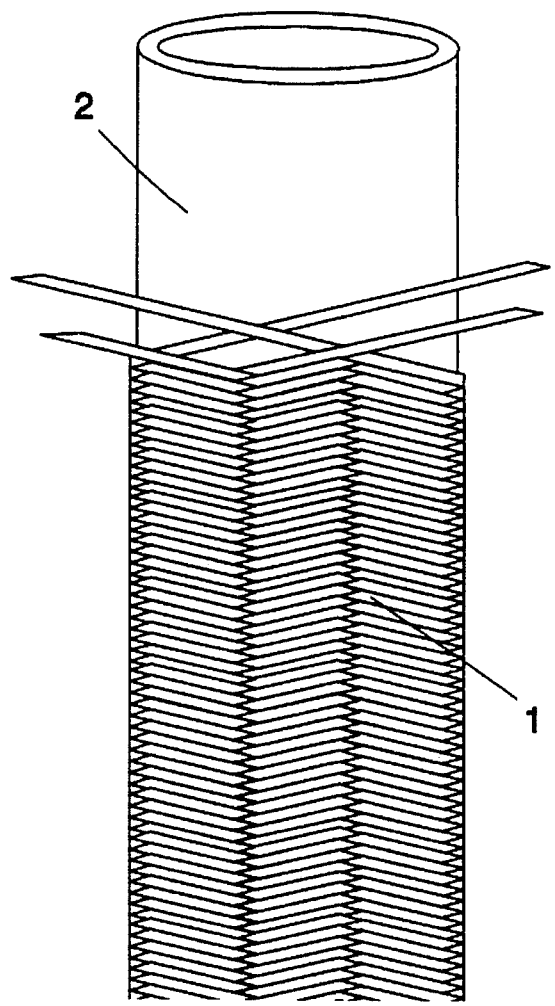
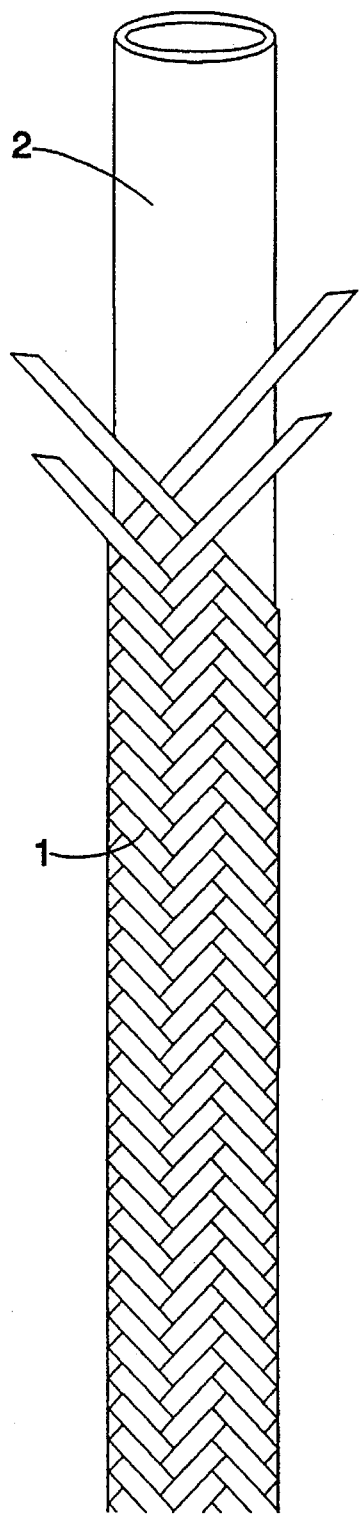

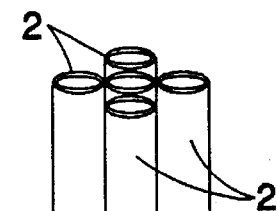
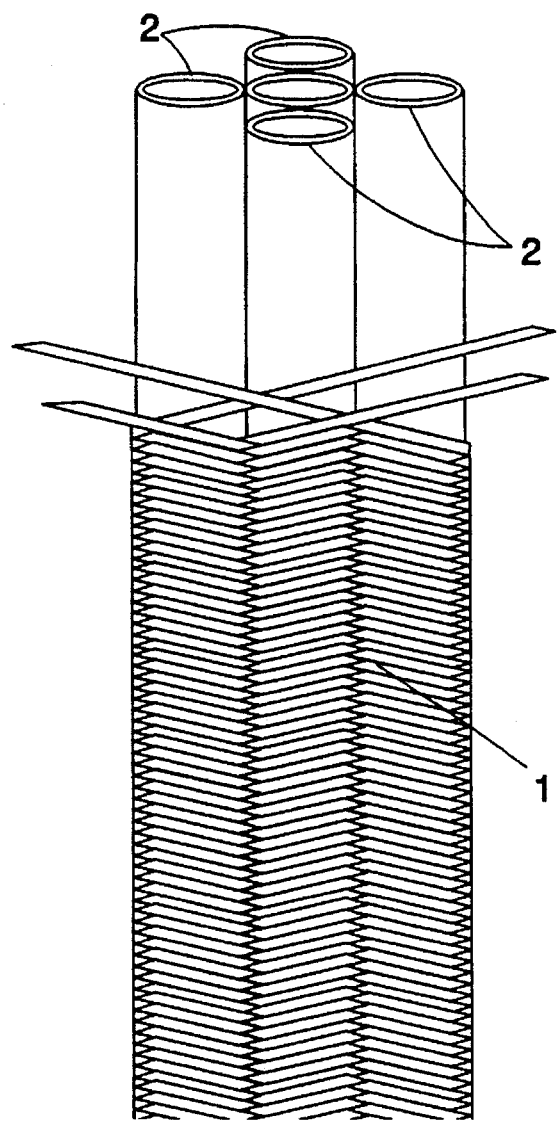
Figure 4a
Figure 4b

ELASTIC BINDING DEVICE WITH RUBBER TUBING CORE

FIELD OF THE INVENTION

This invention relates to a novel elastic binding device which consists of a core member of one or more latex rubber tubes covered by a woven jacket.

BACKGROUND OF THE INVENTION

Conventional elastic cords, such as bungee cords, usually consist of one or more natural or artificial rubber strings surrounded by a woven jacket. The woven jacket, made of nylon or other similar materials, is made of threads woven in a tubular form and are elongated or contracted with the core member. Elastic cords are used for trailer, car, and bike tie downs, trampolines, and numerous other application. However, the versatility, durability, and performance of conventional cords are limited by its construction and design, which is improved by this invention.

There are many structural disadvantages of conventional cords. Generally, the rubber stings comprising the core of conventional elastic cords are wider than they are thick, thus when the strings are stretched the width of the strings becomes noticeably more distorted than does the thickness. As the cord is elongated the core member grows slimmer, yet the woven fabric remains the same thickness, thus creating a gap between the core and the jacket. Over time, this gap results in irregular shifting of the rubber strings; eventually, continuous use may lead to fatigue and premature failure or breakage of the cord. Moreover, the strength and design of the conventional elastic cord is limited to the number of rubber strings used for the core. Thus, in order to build a stronger cord, the diameter of the elastic cord must be increased by using more rubber strings for the core, thereby increasing the diameter of the cord. Furthermore, because the rubber strings of conventional elastic cord are densely packed together, it has limited flexibility and malleability and cannot be easily knotted. In addition, its dense structure can be harsh on any objects being tied down.

SUMMARY OF THE INVENTION

The object of the present invention is to build a binding device that improves conventional elastic cord with respect to durability, flexibility, versatility, and enhanced strength without increasing cord width. The improved design and construction of this invention will facilitate knotting and new uses of elastic cords given their enhanced malleability.

The elastic binding device invention consists of a core member that comprises one or more natural and/or artificial hollow rubber tubes. If a number of rubber tubes are used, the tubes can be of the same or varying wall widths and diameters. A woven jacket covers and protects the core and consists of left and right strands of nylon, cotton, polypropylene or other materials that are braided at the proper angle so the cover elongates and contracts with the core member.

BRIEF DESCRIPTION OF DRAWINGS

FIGS. 3a and 3b show the invention comprising a single rubber tube core in its normal and extended states.

FIGS. 4a and 4b show the invention comprising of multiple rubber tube cores in their normal and extended states.

DETAILED DESCRIPTION OF THE INVENTION

Figure 1A:
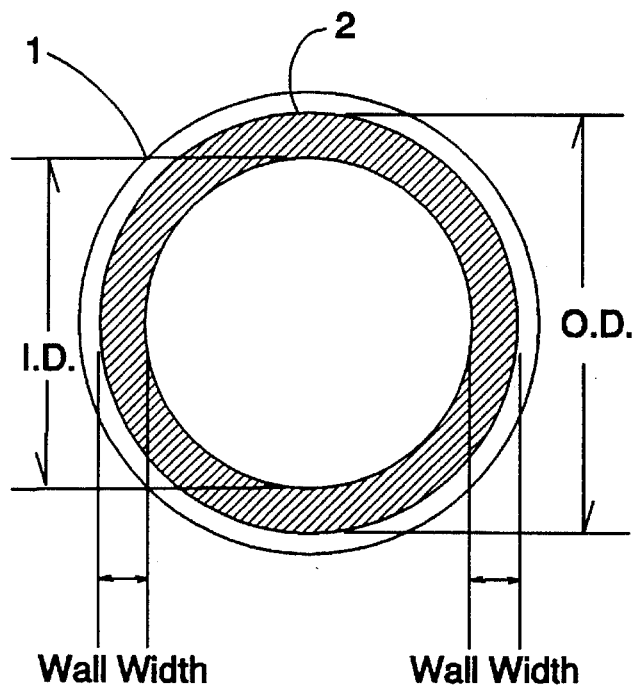
FIGS. 1a and 1b illustrate cross-sectional views of the invention whose core consists of a single rubber tube that differ in wall-widths and inner diameters.
Figure 1B:
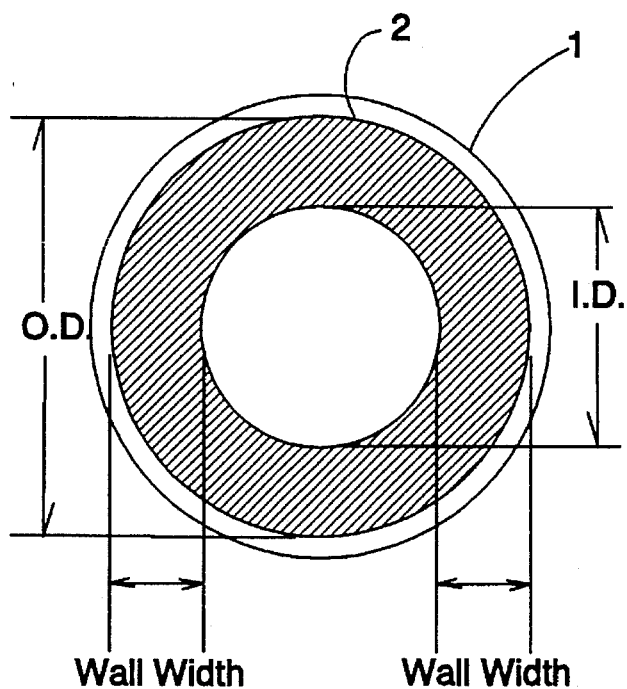

Three forms of measurement are used to measure tubing. O.D. refers to the outer diameter which is the maximum distance between the outside walls of the tubing. I.D. refers to the inner diameter which is the maximum distance between the inside walls of the tubing. The wall width is the cross-sectional width of the wall that makes up the structure of the tubing. Increasing the wall width increases the strength of the cord, as more material is used in its construction. Tubes with the same O.D. may have different I.D.s and wall widths. For example, as FIGS. 1a and 1b indicate, for two tubes of the same O.D., as the I.D. of tubing decreases, the wall width of the tubing increases, creating a stronger cord. Unlike conventional cords, to increase strength of the invention, the outer diameter need not be increased. Thus the invention increases the versatility of the cord design, as cords with the same width yet varying strengths can be built, depending upon the thickness of the core's wall width and the number of tubes used in the core. The tensile strength of tubes vary according to their outer and inner diameters and wall width dimensions.

Another advantage to using a single core of tubing as opposed to numerous elastic strings is that the core (2) imitates the elastic characteristics the woven jacket (1) because both parts have tubular structures. When conventional elastic cord is stretched, the core member and the jacket grows slender, but not in a similar fashion, thus forming gaps between the core member and the woven jacket. This causes the threads of the woven jacket to change their position relative to the core member, eventually causing both unevenness in the woven material and fatigue. If a single tube is used, instead, for the core member (2) of the invention, the single rubber tube will "fit like a glove" within the woven jacket (1), thus minimizing the gap that forms between the core member and reducing the risk of fatigue and premature breakage.

U.S. Pat. No. 1,050,443 employs a woven elastic tube for the core member of the elastic cord, weaving rubber strings within the woven fabric. To make this cord stronger it would need much more weaving. The design of the rubber tubing invention confers far more versatility. The invention consists of two parts—the rubber tubing core (2) and the outer woven jacket (1)—which are completely separate from each other. Although generally the flexibility is more important than the strength of an elastic cord, if it is necessary to make the binding device stronger, it can easily be manufactured to have tubing with a thicker wall width. Thus the tube (2) and jacket (1) components can be interchanged to create a variety of different cords of the same width but of varying strength, flexibility, and elasticity.

Figure 2A:
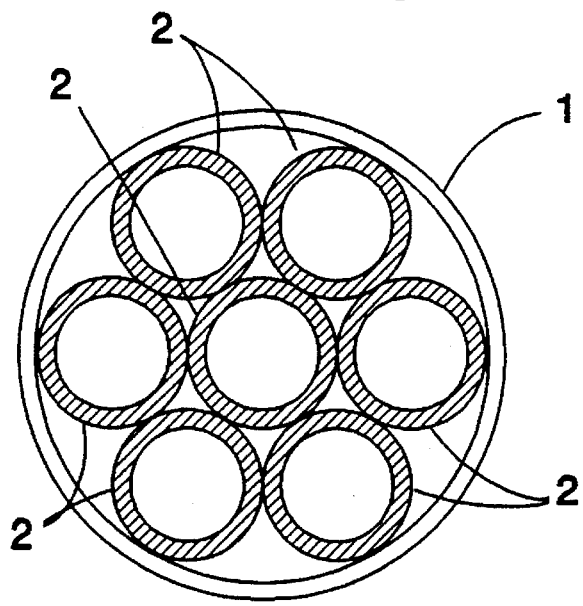
FIGS. 2a and 2b illustrate the cross-sectional views of the invention with a number of rubber tubes.
Figure 2B:
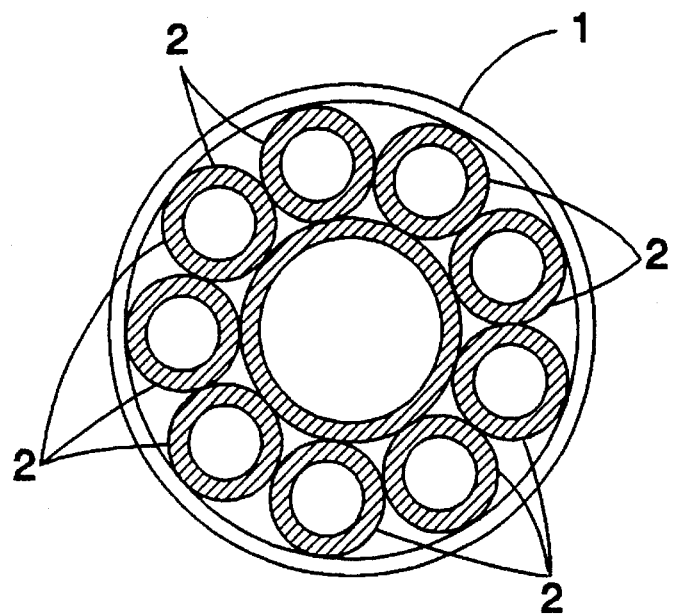

The core (2) of the invention can also consist of multiple tubes of the same or different sizes. FIGS. 2a and 2b illustrate how multiple tubes can comprise the core(2) of the invention. FIG. 2a illustrates how multiple rubber tubes of the same size can comprise the core (2) and FIG. 2b illustrates how rubber tubing of different sizes can comprise the core (2). The strength of the invention can be increased by two ways. First, rubber tubes of the same size but greater wall widths can be used, second, more rubber tubes can be used. The first option will not affect the diameter of the binding device, whereas the second option generally will increase the device diameter. In either case, virtually limitless combinations of rubber tubes can be used to create the invention with different strengths. As a result, the design of the invention is highly versatile, and can be customized for a variety of applications.

FIGS. 3a and 3b, 4a and 4b illustrate profile representations of the invention, detailing how the woven jacket (1) covers the core member (2) and how the invention appears in its extended and distended states. These figures illustrate the jacket's (1) construction—of balanced left and right strands of material braided at the proper angle and allows the jacket to extend and distend with the core. This type of braided jacket design is used for rope and conventional elastic cords and has proved effective in protecting the core from weather and endurance. However, the cores of conventional elastic cords generally consist of strips of rubber. When these strips are stretched, they become slimmer; however, the distortion is more prevalent at the widest section of the rubber strip than the thinnest. The rubber strings of conventional cords have a greater tendency to shift due to their unequal distortion, affecting the strength of the cord. Rubber tubing acts differently. The distortion is equal and unilateral along the entire length of the tubing because it has a round and even structure. When the invention is extended, the rubber tubing imitates the woven jacket (1) which becomes equally distorted. This aspect of the invention reduces fatigue and breakage. In addition, stretching the cord places cross-sectional outward forces on the tube, a result of the natural tendency of the rubber tubing to retain its tubular structure. This tendency minimizes the shifting of the core(2) relative to the woven jacket (1), thus reducing fatigue and premature breakage.

Figure 5:
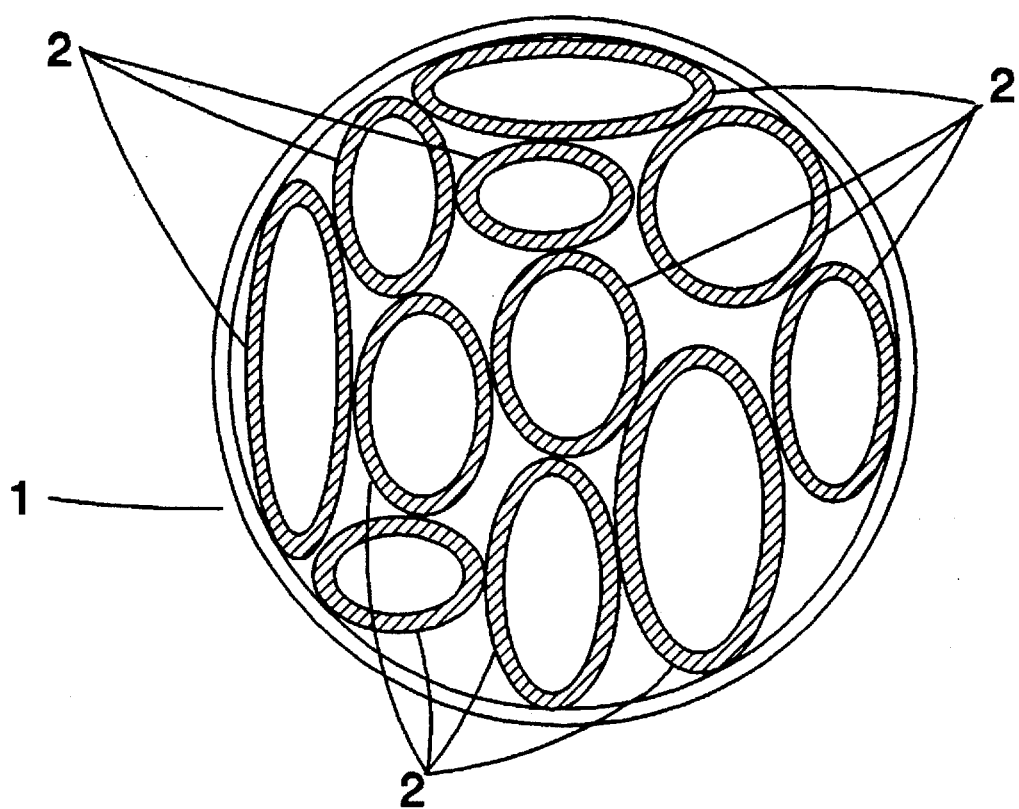
FIG. 5 illustrates how the cord, when elongated, forces the woven jacket to squeeze the rubber tubes.

The design of the elastic cord described by U.S. Pat. No. 4,513,063, coated rubber cord, addresses the problem of core and jacket shifting by placing rubber threads woven within and wrapping around the jacket, helping the jacket constrict around the core when stretched. Rather than employing inward constricting forces, such as jacket threads, the rubber tubing invention relies on the natural tendency of the tubular structure to push outward against the jacket (1). Depending on the thickness of the walls of the rubber tubes, they may be squeezed by the tightly woven jacket (1) as illustrated in FIG. 5. However, this does not affect the performance of the invention, as the tubes(2) still mimic the elastic nature of the woven jacket(1).

The hollow nature of the rubber tubing core(2) confers many other advantages upon the elastic binding device. First, the invention can be easily knotted. The cores of conventional elastic cords consist of densely packed rubber strings. Although a conventional cord is flexible, it is not malleable. Because the invention is hollow it is quite malleable, so when the binding device tied the knot takes the space of the hollow void, creating an extremely strong knot. The invention is particularly effective when tying complicated knots, which require flexibility and malleability. Conventional elastic cords can not always be tied, especially into complicated knots, because the core member is dense and cannot be squeezed. Second, the invention has a more cushioned feel. Conventional elastic cord is hard, and if it is used as a tie-down device, it can cut into whatever is being tied down. The hollow core(2) of the invention thus makes it safer to use. Lastly, the invention could also be used as a flexible, elastic hose.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. An elastic binding device, comprising:
   a) a core of at least one rubber tube, natural or synthetic; and
   b) a woven jacket comprising left and right strands of nylon, cotton, polypropylene or other materials that are braided at the proper angle so that said woven jacket covers said core member.

2. An elastic binding device of claim 1, wherein said core comprises one tube.

3. An elastic binding device, comprising:
   a) a core of at least two or more rubber tubes, natural or synthetic; and
   b) a woven jacket comprising left and right strands of nylon, cotton, polypropylene or other materials that are braided at the proper angle so that said woven jacket covers said core member.

4. An elastic binding device of claim 3, wherein said core comprises two or more rubber tubes of different wall widths, different diameters or different tensile strengths of rubber tubing.

5. An elastic binding device of claim 3, wherein said core comprises two or more rubber tubes of the same wall width, diameter, and tensile strength.

* * * * *